United States Patent [19]

Souza

[11] 3,837,599

[45] Sept. 24, 1974

[54] CASSETTE

[75] Inventor: Augustine A. Souza, San Jose, Calif.

[73] Assignee: Polygon Concepts, Inc., Menlo Park, Calif.

[22] Filed: May 26, 1972

[21] Appl. No.: 257,436

Related U.S. Application Data

[63] Continuation-in-part of Ser. No. 136,365, April 22, 1971.

[52] U.S. Cl. .................................. 242/199, 242/74

[51] Int. Cl.... G03b 1/04, G11b 15/32, G11b 23/04

[58] Field of Search ............ 242/74, 74.1, 197–200; 274/4 C, 11 C

[56] References Cited

UNITED STATES PATENTS

| | | | |
|---|---|---|---|
| 3,326,483 | 6/1967 | Ivans | 242/199 |
| 3,495,787 | 2/1970 | Wallace | 242/199 |
| 3,591,102 | 7/1971 | Keiner | 242/74 |
| 3,661,345 | 5/1972 | Ritz, Jr. et al. | 242/74.1 |
| 3,661,345 | 5/1972 | Ritz, Jr. et al. | 242/199 |
| 3,712,559 | 1/1973 | Schwartz | 242/199 |

*Primary Examiner*—Leonard D. Christian

[57] ABSTRACT

A cassette comprising a pair of identical sleeves in mating relationship enclose a tape reel and hub assembly, a tape guiding and tensioning member assembly and a tape back-up pressure assembly. The sleeves are inserted within a body member and removably held therein mechanically. The construction eliminates the need for sonic welding and liquid bonding. The elimination of undercuts in the design and the above method of assembly permits the use of low cost materials and manufacturing techniques. For tape control during tape run-up, running, and changing of the direction of tape movement there is provided tape guiding and tensioning members in the form of a plurality of self-adjusting idler rollers which absorb tape shock and slacks for reducing whipping, looping, spilling and other tape jamming events. A plurality of cantilever mounted resilient spring-like members are further provided for applying a variable degree of retarding force through friction to tape reel hubs to further reduce tape jamming. To permit removal of the sleeves and various assemblies enclosed therein, the sleeves are provided with means for manually releasing the sleeves from the body member. In an alternative embodiment, a tape hub or hub ring with diametrically opposed raised portions is provided for reducing friction. For improved tape pack uniformity a hub with a plurality of radially extending blades to form a reel is provided. A flexible tape retaining member in a hub for automatic machine tape loading is also provided.

6 Claims, 50 Drawing Figures

PATENTED SEP 24 1974 3,837,599

SHEET 03 OF 10

CASSETTE

BACKGROUND OF THE INVENTION

This is a continuation-in-part of application Ser. No. 136,365, filed Apr. 22, 1971, entitled CASSETTE and assigned to the same assignee as the present application.

The cassette, substantially a self-contained magnetic tape and tape handing device, was originally conceived to replace the 45 RPM phonograph record. It was the intention of the designers to overcome the disadvantages of the vinyl disc which is prone to damage, has a limited life, possesses severe limitations on the amount of music that can be recorded on it and requires a large, costly non-mobile player unit that generally can only be used effectively when placed absolutely flat. In addition, the user has no means of making recordings on the discs. Initially the cost factor was the single most important consideration in determining the design of the cassette and all other considerations were subordinated to this end goal.

When the cassette became available to the general and business public the potential use of the method for low cost, improved audio, digital data and video storage became apparent.

Presently available cassettes, however, are relatively expensive to manufacture, suffer from problems of tape looping and jamming and exhibit insufficient fidelity; a severe problem especially when they are used for digital and video storage.

Tape jamming, whipping, looping, and jerking, resulting in unsatisfactory reproduction of recorded data and poor audio fidelity, is attributed in great measure to poor tape velocity control. Poor tape velocity control, a problem at low tape speeds, becomes a severe obstacle to high speed recording and reproduction.

Until the advent of the present invention, sonic welding, liquid bonding and the use of screws and the like have predominated in the assembly of cassettes. Because sonic welding changes the 'memory' of plastic and results in a brittle cassette, costly materials are presently used to obtain a shock proof product. Then too, sonic welds vary in strength and thus cassettes vary in strength. Moreover, this weld often leaves tiny pinholes (of the order of 1 mil in size) that permit the entrance of dust and dirt that is harmful to the magnetic surface on the tape used therein. Overcoming the effects of sonic welding requires the use of additives to give the plastic high impact characteristics and results in coloration of the plastic and increases material and production costs. Furthermore, both sonic welding and liquid bonding preclude access to the tape which may be necessary to the recovery of tape where a tape does jam or tear. Thus, digital cassettes are typically screwed together (a costly assembly process to permit disassembly in case of tape jam).

SUMMARY OF THE INVENTION

A principal object of the present invention is a cassette comprising a pair of sleeves enclosing the active components which include a tape reel and hub assembly, tape guiding and tensioning member assembly and a tape back-up pressure assembly. The sleeves are removably inserted within a body member and held therein by mechanical forces eliminating the need for sonic welding and liquid bonding. The elimination of sonic welding and liquid bonding permits the use of low-cost, clear, general-purpose plastics. The elimination of undercuts in the design of the various parts permit optimization of the full shot capacity of an ejection molding machine generating lower cost in the manufacture of the parts. Furthermore, by eliminating undercuts, the parts can be molded vertically instead of horizontally, increasing throughput and further reducing costs.

A further object of the present invention is a cassette in which tape whipping, looping, spilling and uneven winding are reduced to a minimum. In accordance with this object, there is provided a pair of self-adjusting rollers which maintain the tape under sufficient tension to permit high speed recording as, for example, 120 inches per second or over 60 times the playback speed of typically 1⅞ inches per second used with conventional cassettes. The self-adjusting rollers are allowed to move in curved slots in recesses to absorb tape shock and slack, etc., and thus act as true idlers. The wheels take up the slack in the tape due to the centrifugal forces acting on the wheel as it is driven by tape bearing against its surface. As the tape speed increases, so does the centrifugal force which causes the roller to move along the recess. In present day cassettes, all rollers are fixed and hence are quite unfunctional as far as tape tension control is concerned.

To further control the movement of the tape there is further provided a pair of oppositely directed spring-like members mounted in cantilever fashion for slideable engagement with each reel hub within the cassette. Each spring-like member is typically ring shaped and is so positioned that a slight tilt is imparted to the reel hub compared with the horizontal axis of the cassette when the hub is at rest. As the hub rotates, the hub is driven more parallel to the horizontal axis of the cassette as by gyroscopic forces compressing the two rings that touch its edges on opposite sides. The amount of drag imparted to the hub depends on the angle of the ring springs and the speed of the hub. The magnitude of the drag is typically chosen to be within the range of 0–2 grams.

In effect, this tension system sets up an equilibrium between the idler wheel previously discussed andd the equipment drive. The canted or edge pressure is better than straight down pressure because the latter would be too strong a pressure, would not be capable of automatic release as the hub speed slows and would displace the tape pack.

In practice, while the self-adjusting idler pulley system is found to contribute little to tape control once the change in the direction of the tape has occurred, the above described additional tension control system on the reel hubs appears to take up and absorb tape shock and slacks in the dynamic mode.

In an alternative embodiment, a tape hub or hub ring with diametrically opposed raised portions is provided for reducing friction. For improved tape pack uniformity a hub with a plurality of radially extending blades to form a reel is provided. A flexible tape retaining member in a hub for automatic machine tape loading is also provided.

These and other features of the present invention will become apparent in the following detailed description and accompanying drawings hereinafter described.

DETAILED DESCRIPTION OF THE DRAWINGS

Figure 1:
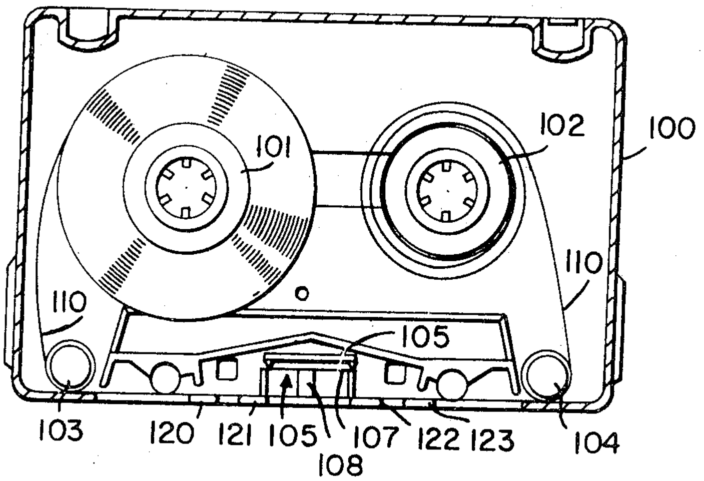
FIG. 1 is a plan view of the prior art cassette, with a wall omitted, exposing the active components.
Figure 2A:
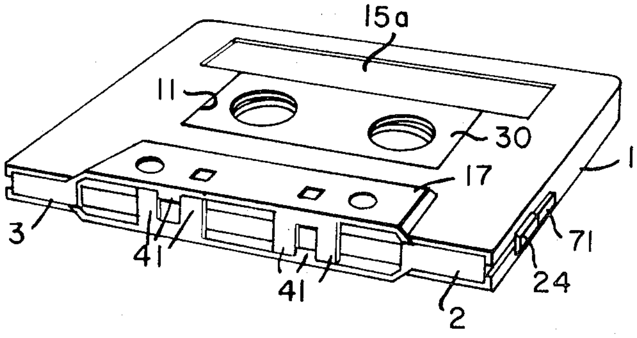
FIG. 2A is a perspective view looking from the front toward the rear of the cassette of the present invention showing the sleeves within the body member.
Figure 2B:
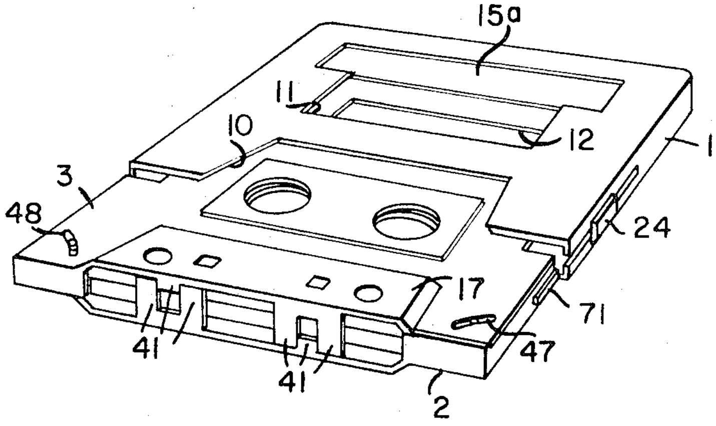
FIG. 2B is a perspective view looking from the front toward the rear of the cassette of the present invention showing the sleeves partially inserted within the body member.
Figure 2C:
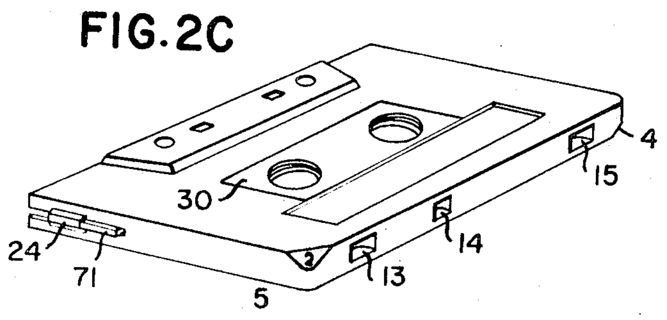
FIG. 2C is a rear perspective view of the cassette of the present invention.
Figure 2D:
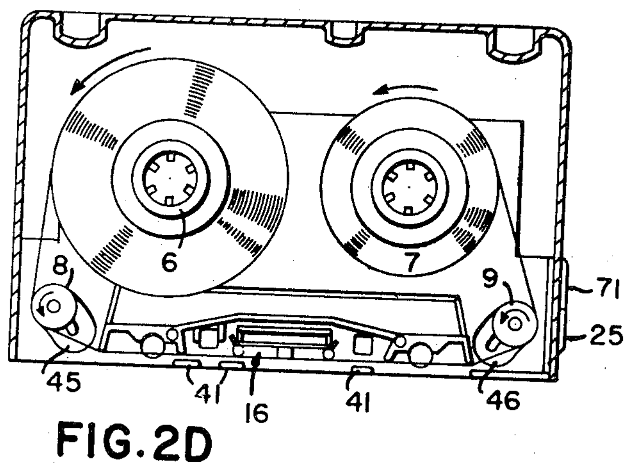
FIG. 2D is a plan view of FIG. 2A with the upper wall omitted to expose the active components.

Referring to FIG. 1, there is illustrated a conventional cassette comprising a body member 100 within which is rotatably mounted a pair of spoked-tape hubs 101, 102 and a pair of guide rollers, 103, 104 having a fixed axis of rotation. A spring biased tape back-up pressure assembly 105 comprising an electrically conductive spring 107 bearing a pad 108 is mounted intermediate rollers 103, 104 at the front end of the cassette body member 100. A magnetic tape 110 is selectively wound around hubs 101, 102 by means of a machine located motor driven shafts (not shown) which engage hubs 101, 102 when the cassette is inserted into a machine. A plurality of apertures 120–123 are further provided in the front end of body member 100 to permit access to tape 110 by other machine located elements such as erase heads, record/playback heads and pressure rollers (not shown).

As tape 110 is transported at different and varying velocities from one of hubs 101, 102 to the other, a number of tape jamming events are found to occur frequently in cassettes of presently conventional design. Tape spillage can occur as shown by the loose coils about hub 102. This is generally caused by the hub free wheeling as the tape drive slows. While the machine located shaft engaging hub 102 could be modified to prevent or reduce freewheeling, studies have shown that few machines are so equipped. Looping can occur, as illustrated by the arcuate path of tape 110 between roller 103 and hub 101. Looping occurs when the velocity of hub 101 changes with respect to the velocity of tape 110. Uneven tape winding [as illustrated by the solid concentric lines about hub 101] results in the tape edges brushing against the cassette walls, causing damage to the tape and uncontrolled amounts of friction affecting tape velocity and hence the accuracy with which magnetically recorded signals are extracted from the recording medium. These and other tape jamming events are well known to those familiar with cassettes.

Figure 3A:
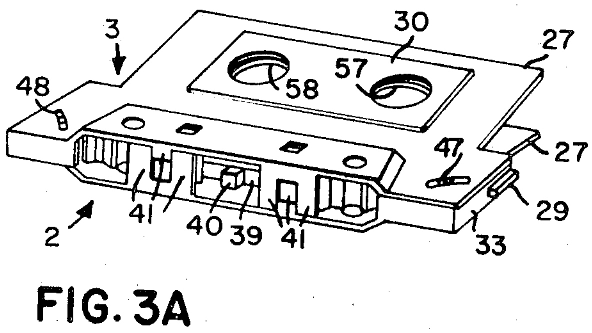
FIG. 3A is a perspective view of the sleeves of the present invention.
Figures 3B, 4, 5A:
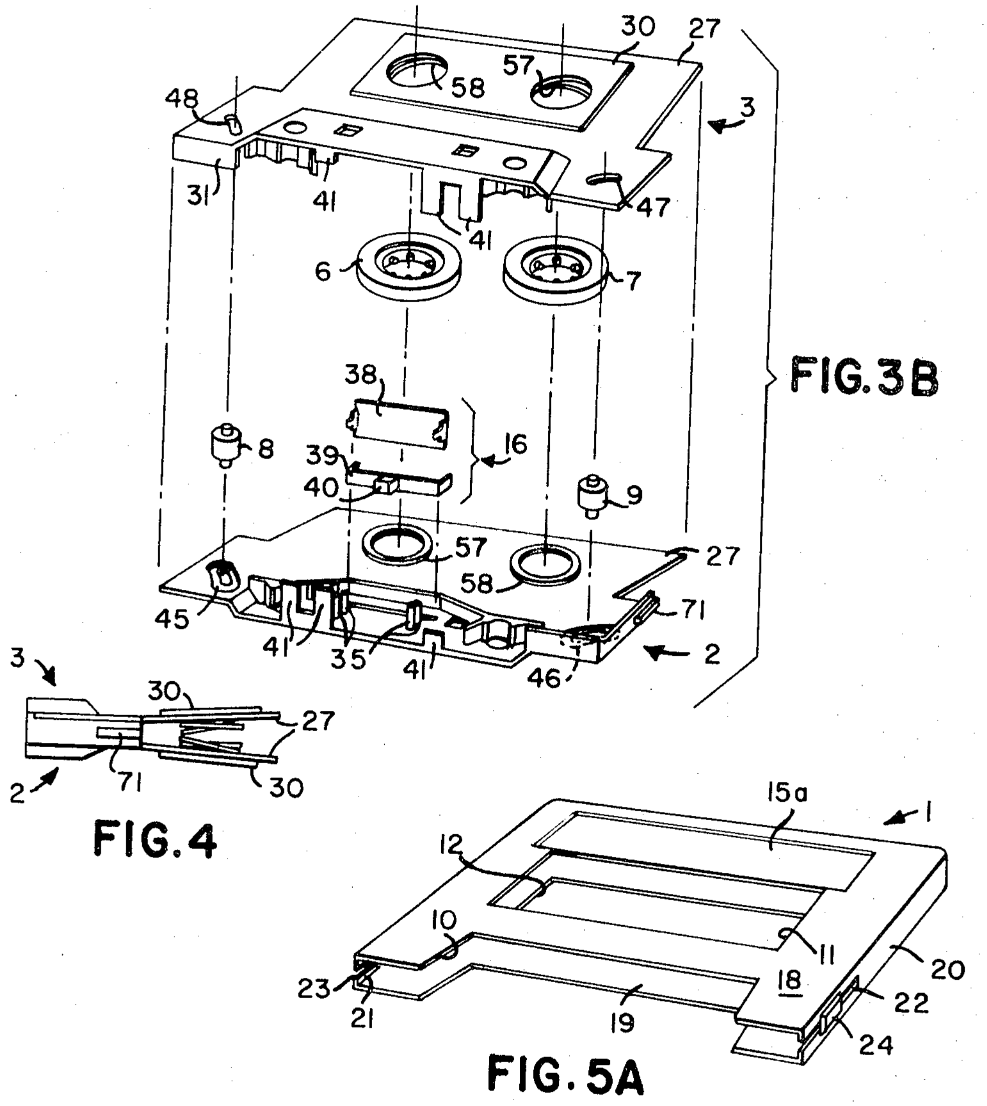
FIG. 3B is an exploded view of the sleeves and enclosed assemblies.
FIG. 4 is a side elevational view of FIG. 3A.
FIG. 5A is a front perspective view of the body member of the present invention.
Figure 5B:
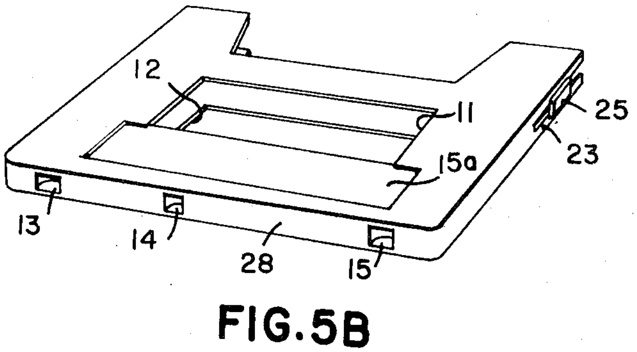
FIG. 5B is a rear perspective view of the body member of FIG. 5.
Figure 6:
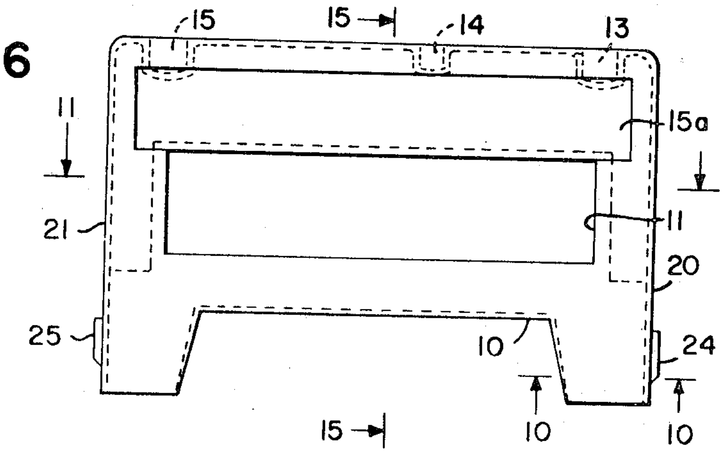
FIG. 6 is a plan view of the body member of FIG. 5.
Figure 7:
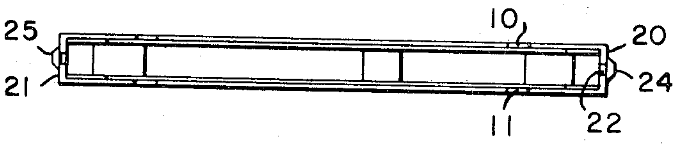
FIG. 7 is a front elevational view of the body member of FIG. 6.
Figure 8:
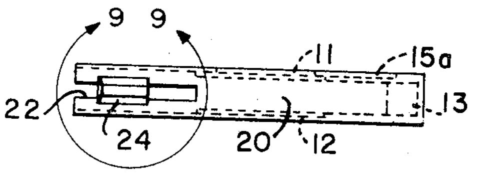
FIG. 8 is a side elevational view of the body member of FIG. 7.
Figure 9:
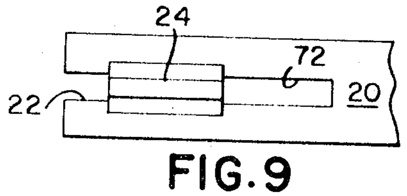
FIG. 9 is an enlarged view taken along lines 9—9 of FIG. 8.
Figure 10:
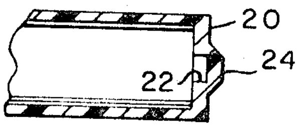
FIG. 10 is an enlarged partial sectional view taken along line 10—10 of FIG. 6.
Figure 11:
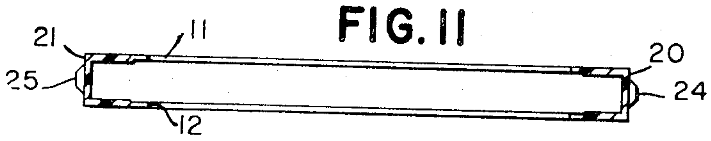
FIG. 11 is the cross sectional view taken along the lines 11—11 of FIG. 6.
Figure 12:
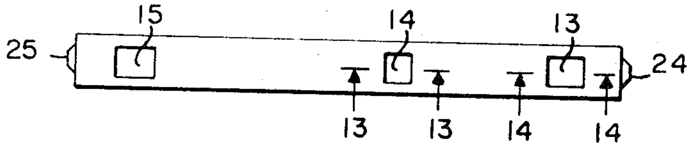
FIG. 12 is a rear elevation view of the body member of FIG. 6.
Figure 14:
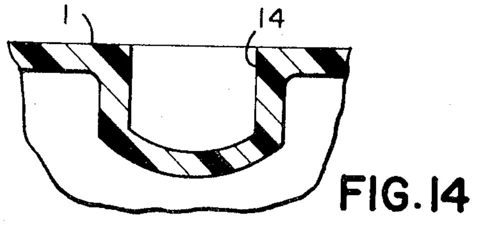
FIG. 14 is a partial cross sectional view taken along the lines 14—14 in FIG. 12.
Figure 13:
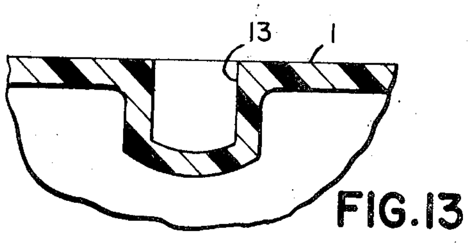
FIG. 13 is a partial cross sectional view taken along the lines 13—13 in FIG. 12.
Figure 15:
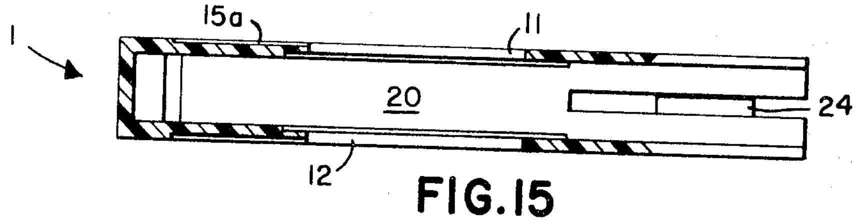
FIG. 15 is a cross sectional view taken along lines 15—15 of FIG. 6.

Referring to FIGS. 1–5 the cassette of the present invention comprises a body member 1, as shown in detail in FIGS. 5A, 5B, and a pair of sleeves 2, 3 as shown in detail in FIGS. 2A-4. Sleeves, 2, 3, enclose the active components of the cassette, which include a pair of tape reel hubs 6, 7, a pair of idler rollers 8, 9, and a tape back-up pressure assembly 16. Sleeves, 2, 3, are assembled in facing relationship and inserted within body member 1 wherein they are held mechanically so as to avoid the requirement for sonic welding, liquid bonding, and fixing by screws, as has been the practice. As is well known, sonic welding changes the memory of general purpose plastic making it brittle. This effect requires the use of additives to give the plastic high impact characteristics, this in turn results in coloration of the plastic and increases material and production costs. The avoidance of sonic welding as well as other types of bonding, together with the elimination of undercuts in body members 1 and sleeves 2, 3, permit the use of low cost, clear, general purpose plastic and air ejection molding techniques which results in high production rates. As will be apparent, sleeves 2, 2, are identical in all respects thereby permitting the manufacture of the sleeves from a mold of a single design, further reducing manufacturing costs.

Figure 16A:
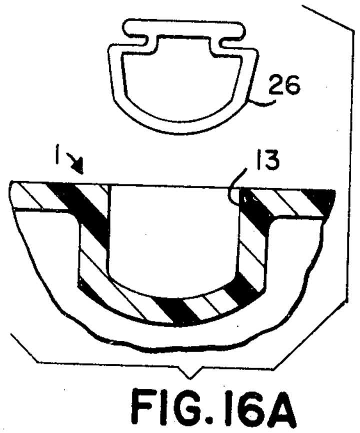
FIGS. 16A–C are plan views of a plug used for closing the aperture shown in FIG. 14.
Figure 16B:
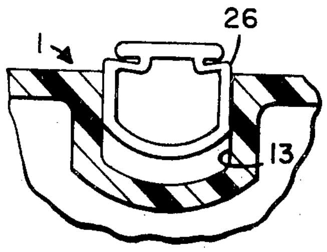
Figure 16C:
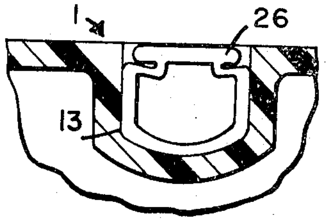
Figure 16D:
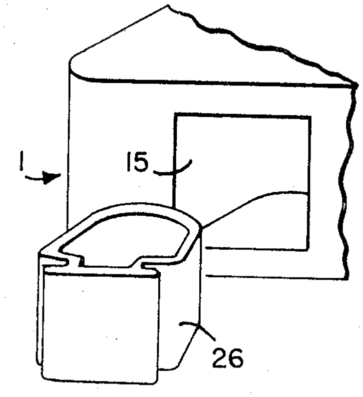
FIG. 16D is a fragmentary perspective view of the plug and aperture of FIGS. 16A–C.

Referring to FIGS. 5–15, body member 1 comprises a generally rectangular, hollow, box-shaped member, formed without undercuts, thereby permitting the optimization of the full shot capacity of an injection molding machine. A recess portion 10 is provided in the front edge of body member 1 for receiving an enlarged front portion of sleeves 2, 3. A pair of windows, 11, 12, are provided in the top and bottom walls 18, 19, respectively, of body member 1 approximately midway between the front and rear thereof. Windows 11, 12, are provided to engage a shouldered portion 30 of a taped sprocket length gauge plate 27 forming a rear part of sleeves 2, 3, as herein described. A plurality of recesses 13–15 are provided in the rear wall portion 28 of body member 1 and cooperate with apparatus in a machine in which the cassette is used for controlling tape recording and reproduction in a conventional number. Side walls 20, 21, of body member 1 are provided with a pair of slots 22, 23, fronted by externally extending flange members 24, 25. Flange members 24, 25, and slots 22, 23, engage a cooperating flange member 29 extending outward from a side wall 33 on sleeves 2, 3, for locking sleeves 2, 3, within body member 1. A plug 26, shown in detail in FIGS. 16A–C, is inserted in recesses 13 and 15 to permit recording on a tape enclosed within the cassette. When plug 26 is removed, no recording can take place. When plug 26 is inserted, one is able both to erase and record in a conventional manner. A similar plug (not shown) is inserted or removed from recess 14 and serves the same purpose. Whether one or more of recesses 13–15 are actually used depends entirely on the equipment in which the cassette is used.

Details of sleeves 2, 3, are illustrated in FIGS. 17–31. As previously described, each sleeve 2, 3, is made from a mold of the same design such that when one sleeve member is placed in relationship with another sleeve member made from the same mold there results an enclosure for enclosing the tape reel and hub assemblies 6, 7, the tape guiding members or idler rollers 8, 9, and the tape back-up pressure assembly 16, hereinafter described. Accordingly, it is understood that the following description with respect to sleeve 2 applies as well to sleeve 3.

Figure 17:
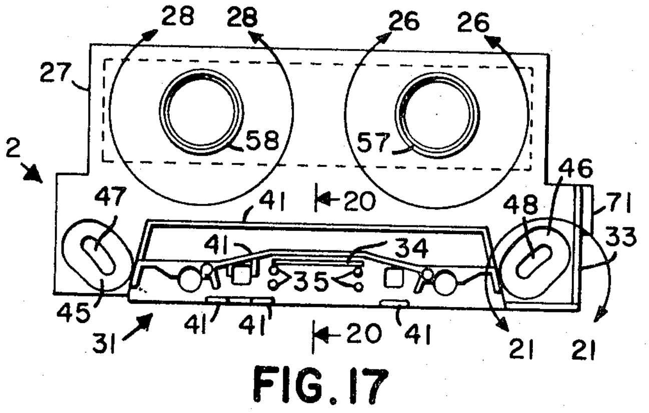
FIG. 17 is a plan view of the sleeves of the present invention.
Figure 18:
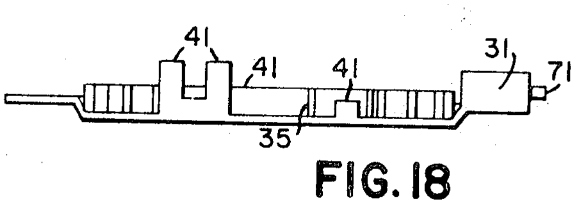
FIG. 18 is an elevation view of FIG. 17.
Figure 19:
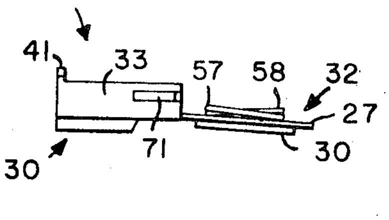
FIG. 19 is the side elevation view of FIG. 18.
Figure 20:
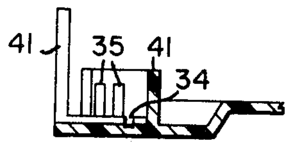
FIG. 20 is a partial cross sectional elevation view taken along the lines 20—20 of FIG. 17.

Referring to FIGS. 17–19, sleeve member 2 comprises a front section 31 and the rear section or tape sprocket length gauge plate 27. Plate 27 extends rearwardly from Section 31 at a slightly outwardly directed angle to the surface of front section 31, as shown more clearly in FIG. 19. The resiliency of the material of sleeve 2 cooperates with this angular displacement to insure seating of a shouldered portion 30 of plate 27 in window 12 of body member 1.

Referring to front section 31, there is provided a slot 34 and a plurality of vertically rising pins 35, 36 for receiving and retaining the tape back-up pressure assembly, shown in more detail in FIG. 3B. Tape back-up pressure assembly 16 comprises an electrically conductive plate 38 and a resilient spring member 39 on which is mounted a non-conductive or felt pad 40. Plate 38 rests in slot 34 in electrical communication with spring 39 rearward of pins 35. Pins 36 provide additional mechanical support for front section 31 in cooperation with a plurality of wall members 41 extending perpendicularly from the surface of front section 31. Tape back-up pressure assembly 16 serves to eliminate static electricity from the tape rod and insures tape contact with the equipment recording head in a conventional manner.

Figure 21:
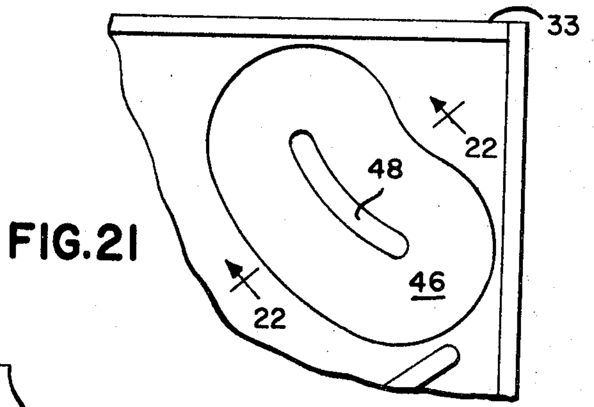
FIG. 21 is an enlarged plan view of the idler roller recess and slot taken along lines 21—21 of FIG. 17.
Figure 22:
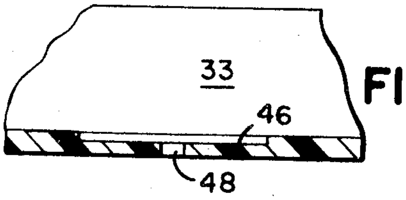
FIG. 22 is a cross sectional elevation view taken along the lines 22—22 of FIG. 21.

On either side of tape back-up pressure assembly 16 in the corner portions of front sections 31 there are provided a pair of accurate tape-guiding member recesses 45, 46, shown in more detail in FIGS. 21–22. A pair of arcuate slots 47, 48, are provided in the center of recesses 45, 46 for freely receiving a shaft on the idler rollers 8, 9, as shown in detail in FIGS. 23–25.

Figure 23:
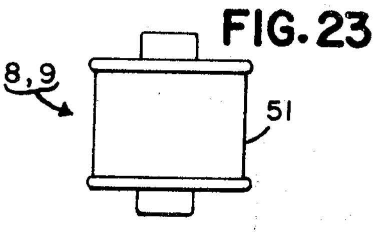
FIG. 23 is an elevation view of the idler roller of the present invention.
Figure 24:
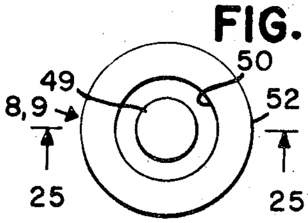
FIG. 24 is a planed view of FIG. 23.
Figure 25:
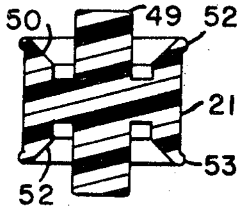
FIG. 25 is a cross sectional elevational view taken along lines 25—25 of FIG. 24.
Figure 26:
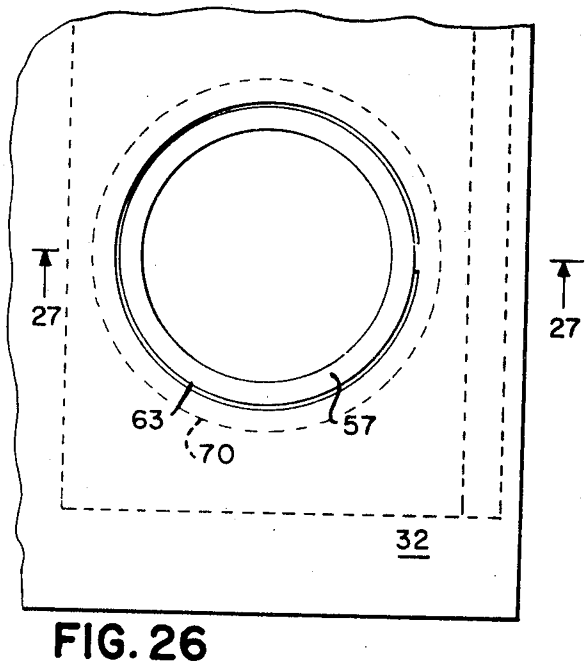
FIG. 26 is an enlarged plan view off the right hub ring taken along lines 26—26 of FIG. 17.
Figure 27:
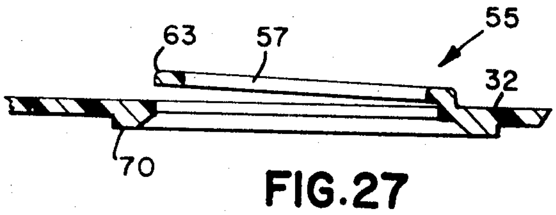
FIG. 27 is a cross sectional elevational view taken along lines 27—27 of FIG. 26.
Figures 28, 29:
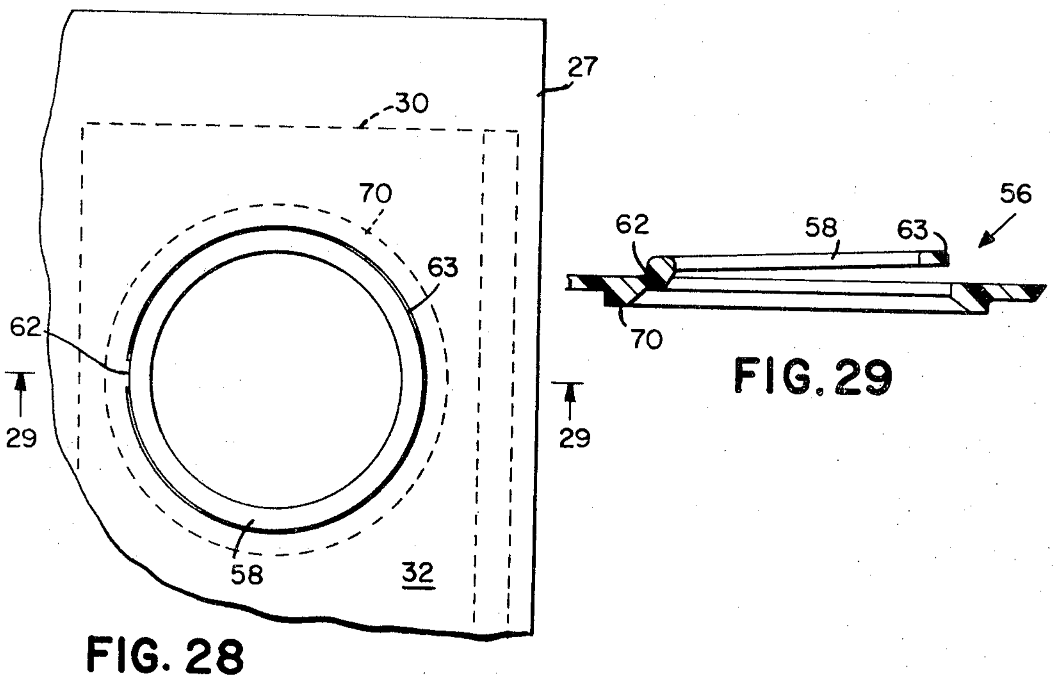
FIG. 28 is an enlarged partial planed view of the left hub ring taken along lines 28—28 of FIG. 17.
FIG. 29 is a partial elevation view taken along lines 29—29 of FIG. 28.

Referring to FIGS. 23–25 rollers 8, 9, both of which are identical, are provided with a tape bearing surface 51 parallel with shaft 49. Tape bearing surface 51 is bounded on both ends by a pair of outwardly directed rolled lips 52, 53. Lips 52, 53, serve to restrict the amount of surface contact rollers 8, 9, make with the surface of recesses 45, 46, thereby reducing friction, and at the same time restrict the motion of the tape in a direction parallel with shaft 49. Unless such motion of the tape is restrained there results an uneven winding of the tape on reel hubs 6, 7, which causes a reel of tape to assume a dish-shaped appearance and make contact with the inside surfaces of the sleeves. Such contact results in fraying of the edges of the tape and loss of tape velocity control. Idler rollers 8, 9, are further provided with recesses 50, 52, which serve to reduce the weight of the rollers, thereby further reducing friction and material for manufacture and lessening material shrinkage.

In operation, as the velocity of the tape bearing against idler rollers 8, 9, changes during the starting and stopping operations, the centrifugal and friction forces affecting idler rollers 8, 9, causes rollers 8, 9, to move along the path of slots 47, 48 to absorb tape shocks and slack. In practice, idler rollers 8, 9, are found to greatly reduce whipping and looping of the tape which has heretofore resulted in jamming, particularly during the stopping and starting of the tape transport operation.

To further reduce whipping and looping of a tape, which is found to occur even after the tape is brought up to speed, there is further provided on the interior surface of sprocket length gauge plate 27 of sleeve 2, a pair of resilient biasing members 55, 56, which bear against the right and left tape reel hubs 6, 7, for applying, by means of friction, a retarding force for controlling the speed of rotation of the hubs as shown in more detail in FIGS. 26–31.

Referring to FIGS. 26–29, resilient biasing members 55, 56, comprise a pair of ring-shaped members 57, 58, mounted in cantilever fashion to the inside surface of plate 27, substantially coaxial with the axis of rotation of hub members 6, 7. The points of attachment 61, 62 of ring-shaped members 57, 58, toward the front and rear of plate 27 are diametrically opposed such that when one sleeve is placed in facing relationship with another similar sleeve the points of contact 63, 64 of the free ends 65, 66 of members 57, 58, with each of hub members 6, 7, are diametrically opposed, as shown in more detail in FIGS. 4, 30, 31.

This will put a slight tilt to hub members 6, 7, compared with the horizontal axis of the cassette body when they are at rest, and clearance is provided for this. When the machine drives the tape and hub member 6, 7, rotate, the hubs 6, 7, are driven more parallel to the cassette's horizontal axis as by gyroscopic action and compress the spring rings that touch their edges at opposite sides. This centers the hub and puts a slight amount of drag on the tape. The amount of drag depends on the angle that ring-shaped members 57, 58, make with plate 27 and the resiliency of the material. As the rate of rotation accelerates the compression is greater. In practice, the angle the ring-shaped members 57, 58, make with the plate 27 is chosen such that there is negligible drag when the hubs are stopped and up to 1–2 grams of drag when the hubs are rotating at speed.

This canted or edge pressure is found to be better than straight down pressure because the latter would be too strong a pressure, would not be capable of automatic release as the reel or hub speed slows, and would displace the hub and tape causing improper reel alignment. This permits the cassette of the present invention to be used in those equipments generating very low starting torque.

Figure 32:
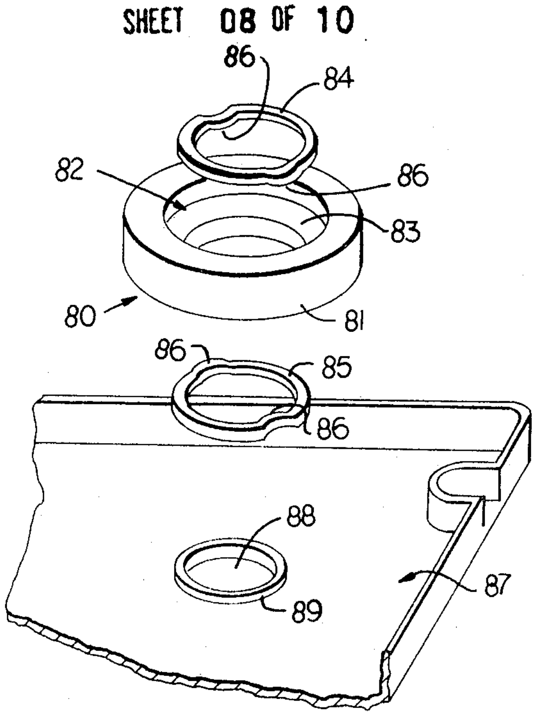
FIG. 32 is a partial exploded prospective view of an alternative embodiment of a hub and ring assembly in accordance with the present invention.

Referring to FIG. 32, there is shown an alternative embodiment of a tape hub supporting ring assembly 80 in accordance with the present invention for use in cassettes using conventional wall mounted rigid tape hub retaining rings. As shown therein, assembly 80 comprises a modified conventional tape hub 81 having an enlarged recess 82. Recess 82 comprises a horizontal portion which serves as a bearing surface for a first resilient hub ring 84. A corresponding recess (not shown) is provided in the underside of hub 81 for receiving a second resilient hub ring 85. Hub rings 84 and 85 are each provided with a pair of diametrically opposed extended portions 86 which slideably engage the horizontal surface 83 of hub 81 at a first and second point respectively. Rings 84 and 85 are sized to securely fit about a pair of hub rings 89, only one of which is shown, secured to the interior surface of a pair of walled members 87, only one of which is shown. It is understood that both walled members 87 mate in facing relationship when assembled for enclosing assembly 80. Rings 89 are found in most conventional cassettes. The entire assembly 80 is coaxial with an aperture provided in walled members 87 for receiving a tape hub drive shaft as is conventional in known cassettes.

As shown, portions 86 on rings 84 and 85 are generally arcuate and extended in the direction of the tape hub 81 and when assembled make contact with only a limited area of the horizontal portion 83 of recess 82. This limited contact area provided by arcuate portions 86 improves control over friction forces affecting the rotation of a tape hub while permitting the use of conventional fixed retaining rings. As the hub bears on the portions 86, the rings 84 and 85 spread outwardly thereby absorbing shock as is encountered, for example, with changes in tape velocity. The point contacts between rings 84 and 85 and hub 81 further permits a slight freedom of rotation of the hub about an axis normal to its principal axis of rotation. This slight rotation improves the uniformity of the tape pack on a hub, thereby reducing dishing and uneven winding experienced with conventional cassettes.

Figure 33:
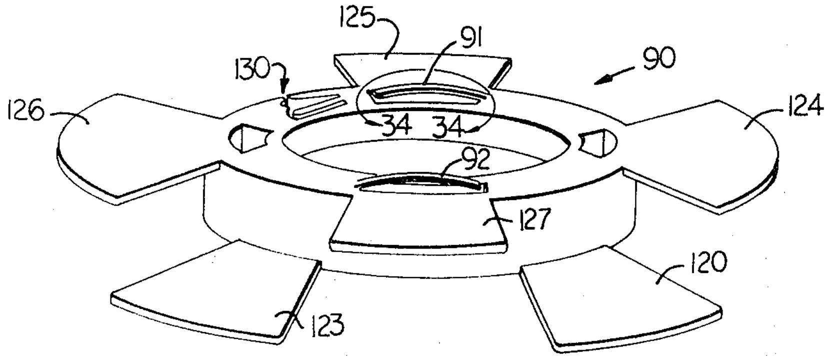
FIG. 33 is a prospective view of another embodiment of a hub in accordance with the present invention.
Figure 34:
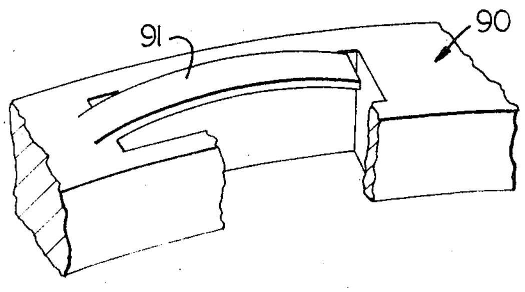
FIG. 34 is an enlarged prospective view of the section 34—34 of FIG. 33.

Referring to FIGS. 33 and 34, there is shown a modified hub 90. Hub 90 is provided with a plurality of diametrically opposed arcuate resilient spring members 91 and 92 formed at its periphery. Spring members 91 and 92 extend outwardly normal to the principal plane of rotation of hub 90 and serve as supporting members for hub 90.

Figure 35:
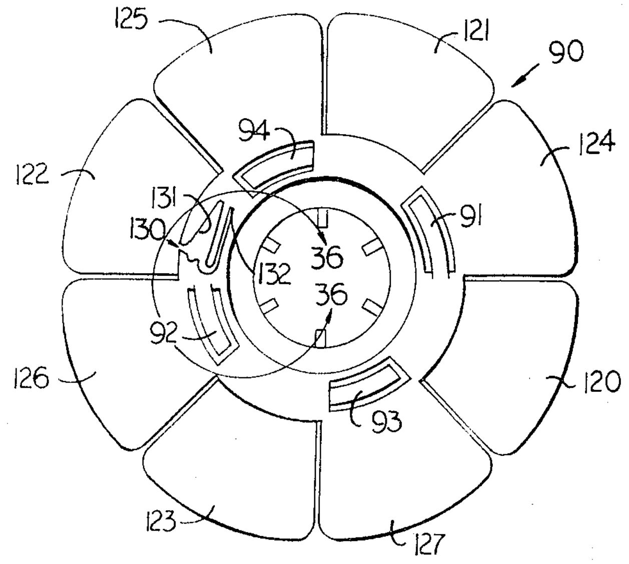
FIG. 35 is a plan view of the hub of FIG. 33.
Figure 36:
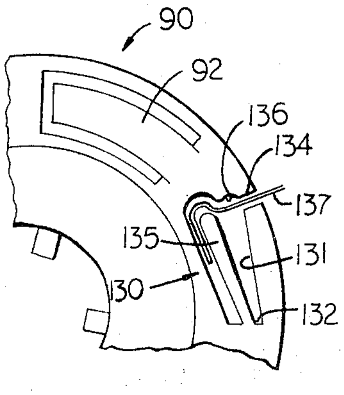
FIG. 36 is an enlarged plan view of a portion of the hub taken along the lines 36—36 of FIG. 35.
Figure 37:
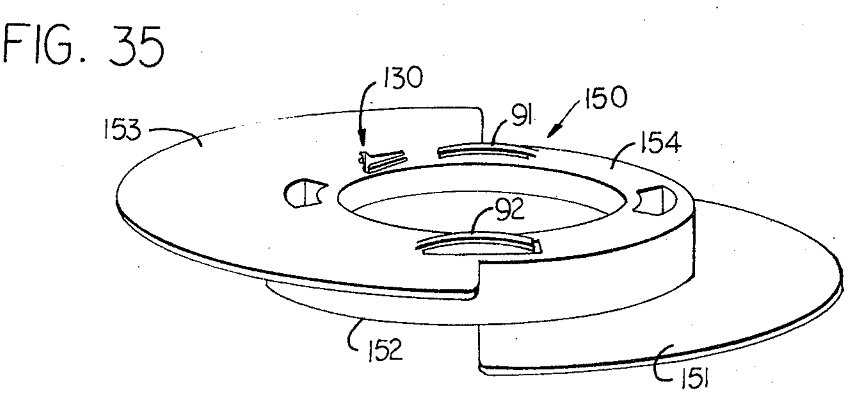
FIG. 37 is a perspective view of still another embodiment of a hub in accordance with the present invention.

In addition to spring members 91 and 92, there is provided, as shown in FIG. 35, a corresponding pair of spring members 93 and 94 on the opposite side of hub 90. Members 93 and 94 are, however, positioned approximately 90° from members 91 and 92 about the principal axis of hub rotation. Typically, spring members 91 and 94 are molded as an integral part of hub 90.

When assembled in a cassette, members 91–94 will mate in slideable engagement with the walls of the cassette for providing a limited area of contact in substantially the same fashion and for the same purpose as is described with respect to hub rings 84 and 85, described above with respect to FIG. 32.

Figure 30:
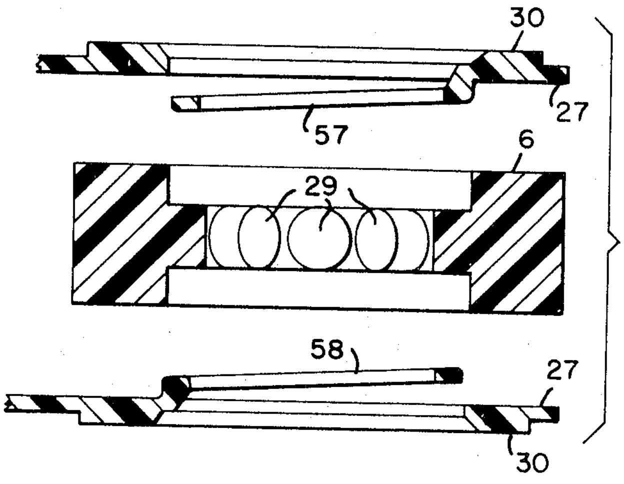
FIG. 30 is a partial cross sectional exploded elevation view of the reel hub, hub springs and sleeves of FIG. 2.
Figure 31:
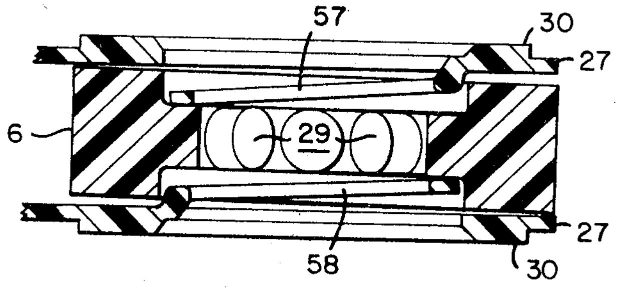
FIG. 31 is an unexploded view of FIG. 30.

It is understood that while shown in a hub with further modifications, spring members 91–94 may be used in a conventional tape hub such as, for example, hub 6 of FIG. 30.

For improved tape pack uniformity hub 90 is further provided with a plurality of radially extending opposing blades 140–147. Blades 140–143 extend from the lower surface of hub 90 and blades 144–147 extend from the upper surface of hub 90. Both sets of blades extend from hub 90 in cantilever fashion. The blades in each set are spaced 90° apart and each set of blades are positioned in a non-facing relationship 45° apart with respect to each other about the principal axis of hub rotation. Each blade in each set further subtends an angle of approximately 45°. Each blade is resilient and serves to gently but firmly guide any tape which comes in contact therewith for providing a tape pack of uniform cross-section when hub 90 is filled. As a further advantage, the absence of undercuts permits molding the hub as an integral unit thereby avoiding any subsequent assembly, as is conventionally required in the manufacture of reel type hubs.

While shown with spring and hub supporting members 91–94, it is understood that hub 90 may be provided with an enlarged centrally located recess and used with rings 84 and 86 as described with respect to hub 81 of FIG. 32. Alternatively, it may be used with cantilevered rings 57 and 58 described with respect to FIG. 31.

Figure 38:
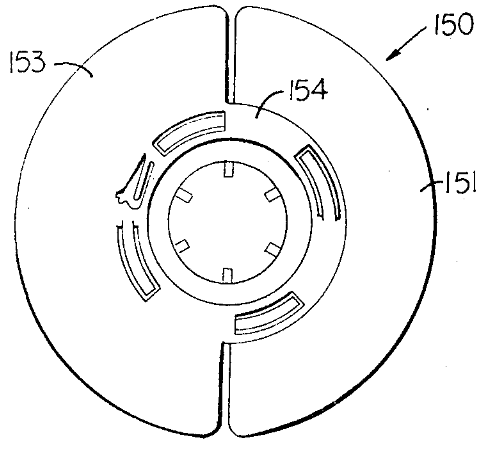
FIG. 38 is a plan view of the hub of FIG. 37.
Figure 39:
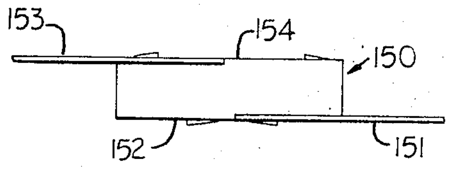
FIG. 39 is an elevation view of the hub of FIG. 38.

With reference to FIGS. 38–39, there is shown a further alternative embodiment of a hub in accordance with the present invention comprising a hub 150. Unlike hub 90 of FIG. 33, there is provided a single blade 151 radially extending from a lower surface 152 of hub 150 and an opposing blade 153 radially extending from an upper surface 154 of hub 150 in cantilever fashion such that blades 151 and 153 are positioned in non-facing relationship. Both blades extend in parallel planes normal to the principal axis of hub rotation and each subtend an angle of approximately 180°. As with blades 140–147 of hub 90 of FIG. 33, each of blades 151 and 153 serve to gently but firmly guide any tape which comes in contact therewith for providing a tape pack of uniform cross-section as hub 150 fills with tape. Further, while shown with spring members 91 and 92 and a tape capture and retaining mechanism 130 as described hereinafter with respect to FIG. 33, it is understood that other means may be used in hub 150 for retaining a tape and for supporting hub 150 in a manner as previously described or as may be found in conventional cassettes.

Figure 40:
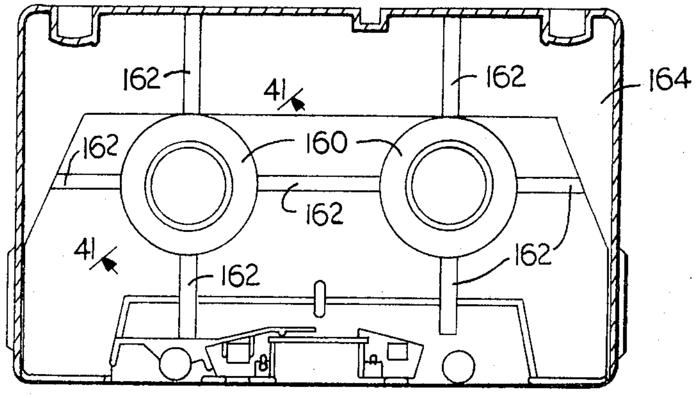
FIG. 40 is a plan view of an alternative embodiment of a hub and cassette body member in accordance with the present invention.
Figure 41:
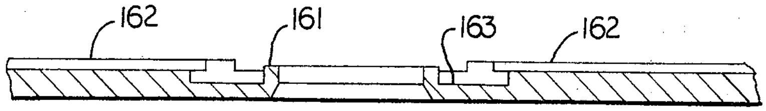
FIG. 41 is a cross sectional view taken along lines 41—41 of FIG. 40.
Figure 42:
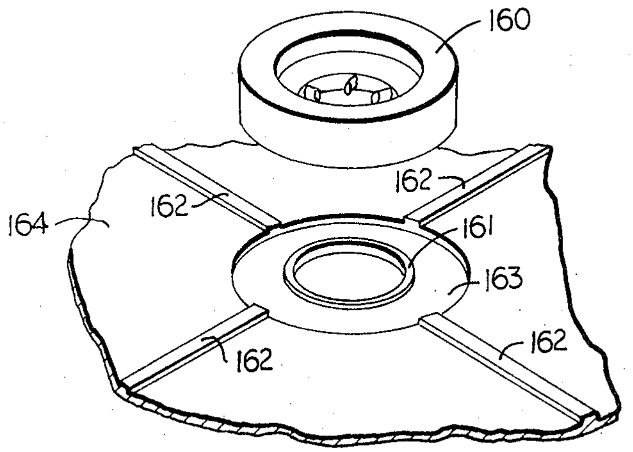
FIG. 42 is a partial exploded view of the hub and body member of FIG. 40.

Referring to FIGS. 40–42, improved tape pack uniformity and reduction in the amount of friction between a tape pack and the interior surfaces of the walls of a conventional cassette or the sleeve members 27 of the present invention as shown in FIG. 3B may be achieved using conventional hubs and hub retaining rings 160 and 161 respectively. This is achieved by the provision of a plurality of ribs 162 extending radially from a hub recess 163 in the interior surface of a cassette body member 164. It is understood that a corresponding body member (not shown) is provided in practice for enclosing hubs 160. The recess 160 is sized to freely receive hub 160 and both are in practice made of a low friction material. The use of ribs 162 is found to eliminate the need for a slip sheet presently used in conventional cassettes. The elimination of the need for a conventional slip sheet results in reduced manufacturing costs and the elimination of a step in the assembly of the cassettes with an improvement in cassette performance. The improved performance is achieved by the reduction in friction forces acting on the tape due to the reduction in wall surface area with which the tape may come in contact as the hub 160 fills.

For the high speed automatic machine tape loading of any of the hubs previously described there is further provided, as shown in FIGS. 33 and 35–38, a tape capture and retaining mechanism 130. As shown in more detail in FIG. 36, mechanism 130 comprises a cavity 131 with a base portion 132 adjacent the periphery of the hub 90. The extent of cavity 131 in a direction parallel with the axis of hub rotation is at least as wide as the width of the tape to be captured therein.

Substantially normal to the periphery of hub 90 there is provided a slot 134 which communicates with cavity 131. Extending from base 132 in cantilevered fashion there is provided an elongated flexible member 135 which is centrally located in cavity 131 and extends adjacent and somewhat beyond slot 134. Between the free end of flexible member 135 and slot 134 there is provided in the wall of cavity 131 opposite base 132, a recess 136.

In operation, the end of a tape 137 is passed through the slot 134 and over the free end of flexible member 135. As the tape is withdrawn, it binds against member 135 pulling it into recess 136 where member 135 is captured binding the tape 137 securely against the walls of the recess.

Each of the hubs are described herein with respect to their use in a cassette. It is understood, however, that other tape and film handling systems, such as computer input/output equipment are similarly concerned with tape pack uniformity and improved control over friction forces between the tape and any enclosure or other member with which it may come in contact.

Typically, air ejection molding is used in making the various parts of the cassette of the present invention. Body member 1 is made of impact styrene, sleeves 2, 3, are made of general purpose styrene, and hub members 59, 60 are made of high density polyproplyene. As is conventional in ejection molding, a ½ ° draft is provided for appropriate walls to facilitate removal of the various parts from the molds by an air blast.

After molding and assembling, the various parts as described between sleeves 2, 3, and sleeves 2, 3 are inserted in body member 1. The flange or shouldered portion 30 of plate 27 engages windows 11, 12 of body member 1 and hold sleeves 2, 3 within body member 1.

Due to the resilient nature of the material used in making the cassette, removal of sleeves 2, 3 for loading and unloading tape therefrom is accomplished by depressing plate 27 from windows 11, 12 while depressing flange 29 from slots 22, 23 in side walls 33 of body member.

It will be appreciated that very few, if any, undercuts are present in the components of the present invention, thus significantly reducing the time and cost of manufacture. It is also understood that other types of plastics, such as for example, Delrin may be used where appropriate.

What is claimed is:

1. In a cassette having a first wall and a second wall enclosing a rotatable tape hub, the improvement comprising: a first means for slideably supporting said hub in spaced relationship from said first wall at a first point, and a second means spaced from said first means for slideably supporting said hub in spaced relationship from said first wall at a second point for controlling friction forces tending to restrain rotation of said hub about its axis; a first hub ring mounted coaxially with said hub and wherein said first and said second means comprise diametrically opposed portions on said first hub ring which extend from said first hub ring in the direction of said hub for slideably engaging said hub at said first and said second points respectively.

2. In a cassette according to claim 1, the improvement further comprising:

a second hub ring concentric with said first hub ring and fixedly mounted to at least one of said first and said second walls.

3. In a cassette according to claim 2 wherein said first hub ring is outside said second hub ring.

4. In a cassette having a first wall and a second wall enclosing a rotatable tape hub, the improvement comprising: a first means for slideably supporting said hub in spaced relationship from said first wall at a first point, and a second means spaced from said first means for slideably supporting said hub in spaced relationship from said first wall at a second point for controlling friction forces tending to restrain rotation of said hub about its axis, wherein said first and said second means comprise a first and a second diametrically opposed portion of said hub, each of said portions extending outwardly from said hub in a direction toward said first wall for slideably engaging said wall at said first and said second points.

5. In a cassette according to claim 4 wherein said first and said second diametrically opposed portions each comprise a thin arcuate resilient strip attached at least at one end to said hub.

6. In a cassette having a housing comprising a first wall and a second wall enclosing a rotatable tape hub, said hub having an upper and a lower surface normal to its axis of rotation, the improvement comprising: a cavity interior of a peripheral wall portion of said hub having a base portion extending substantially normal to said substantially rigid immovable periphery and said upper and lower surfaces, said peripheral wall portion of said hub serving as an outer wall of said cavity; a slot extending through at least a portion of said peripheral wall portion of said hub to said cavity at a point spaced from said base portion for receiving a tape to be wound about the periphery of and coaxial with said hub; an elongated member interior of said peripheral wall portion of said hub having one end attached to said hub at said base of said cavity and a free end extending to a position adjacent said slot, said member being flexible and pivotable about an axis adjacent its attached end and responsive to the insertion and partial withdrawal of a tape wrapped about its free end for moving outwardly to be tightly captured with said tape about its free end in a recess in the end of said cavity; and a recess in the end of said cavity opposite said base for capturing and releasably retaining said free end of said elongated member and said tape when said tape is inserted in and partially withdrawn from said cavity for providing loading of said tape on said hub.

* * * * *